United States Patent
Berson et al.

(10) Patent No.: US 6,841,979 B2
(45) Date of Patent: Jan. 11, 2005

(54) POWER DISTRIBUTION WITH DIGITAL CURRENT CONTROL

(75) Inventors: Yuval Berson, Binyamina (IL); Alon Ferentz, Bat-Yam (IL); Dror Korcharz, Bat-Yam (IL); Nadav Barnea, Or-Yehuda (IL); Shimon Elkayam, Kfar Saba (IL); David Pincu, Holon (IL)

(73) Assignee: PowerDsine, Ltd., Hod Hasharon (IL)

( * ) Notice: Subject to any disclaimer, the term of this patent is extended or adjusted under 35 U.S.C. 154(b) by 283 days.

(21) Appl. No.: 10/151,649

(22) Filed: May 17, 2002

(65) Prior Publication Data

US 2002/0196004 A1 Dec. 26, 2002

Related U.S. Application Data

(60) Provisional application No. 60/292,811, filed on May 22, 2001.

(51) Int. Cl.[7] .............................. G05F 1/40; H02M 7/00
(52) U.S. Cl. ........................ 323/282; 323/285; 363/65
(58) Field of Search ................. 323/282, 285, 323/284; 361/93.8, 103, 58, 64; 307/64, 65, 66

(56) References Cited

U.S. PATENT DOCUMENTS

| | | | |
|---|---|---|---|
| 5,355,077 A | | 10/1994 | Kates |
| 5,544,064 A | | 8/1996 | Beckwith |
| 5,550,702 A | * | 8/1996 | Schmidt et al. ............. 361/103 |
| 5,583,421 A | | 12/1996 | Barbehenn et al. |
| 5,612,580 A | * | 3/1997 | Janonis et al. ................ 307/64 |
| 5,969,515 A | | 10/1999 | Oglesbee |
| 6,049,446 A | * | 4/2000 | Ha et al. ...................... 361/58 |
| 6,101,108 A | | 8/2000 | Wittenbreder, Jr. |
| 6,108,183 A | * | 8/2000 | Beene ........................ 361/93.8 |
| 6,144,194 A | * | 11/2000 | Varga .......................... 323/285 |
| 6,268,716 B1 | | 7/2001 | Burstein et al. |
| 6,404,607 B1 | * | 6/2002 | Burgess et al. ............... 361/58 |

FOREIGN PATENT DOCUMENTS

| EP | 0 685 917 | 12/1995 |
|---|---|---|
| EP | 0 966 086 | 12/1999 |

OTHER PUBLICATIONS

Simonetti, et al., "Design Criteria for SEPIC and CUK Converters as PFP in Discontinuous Conduction Mode", IEEE Industrial Electronics Conference (IECON 1992), pp. 283–288, no date.

Carl Blake, et al., "IGBT or MOSFET: Choose Wisely", International Rectifier. 1998, no date.

William Pelletier, et al., "Current Limiting Defuses the DC/DC Time Bomb". EDN (US Ed.), vol. 43, No. 8, Apr., 1998.

Current Limit Technologies for DC/DC Power Solutions, Switch Power, Inc. 2000, no date.

IEEE Draft P802.3af/D3.0, entitled: "Data Terminal Equipment (DTE) Power Via Media Dependent Interface (MDI)", IEEE Standards Department, Piscataway, New Jersey, 2001, no date.

(List continued on next page.)

*Primary Examiner*—Rajnikant B Patel
(74) *Attorney, Agent, or Firm*—Simon, Kahn

(57) ABSTRACT

Power distribution apparatus, for controlling supply of a current from an electrical power source to at least one load, includes a current sensor, which is coupled to provide an indication of a magnitude of the current flowing to the at least one load. A current limiter is adapted, responsive to the indication, to apply a pulse width modulation to the current drawn from the source so as to maintain the magnitude of the current flowing to the at least one load within a predetermined limit.

31 Claims, 14 Drawing Sheets

OTHER PUBLICATIONS

Ron Lenk, "Application Bulletin AB–20, Optimum Current Sensing Techniques in CPU Converters", Fairchild Semiconductor, 1999, no date.

S. Ben–Yaakov, et al., "The Dynamics of a PWM Boost Converter with Resistive Input", IEEE Trans. on Industrial Electronics, vol. 46, No. 3, Jun. 1999.

S. Ben–Yaakov, et al., << PWM Converters with Resistive Input, IEEE Trans. on Industrial Electronics, vol. 45, No. 3, Jun. 1998.

PowerDsine Application Note 115, entitled: "Power Over LAN™: Building Power Ready Devices", PowerDsine Ltd, Hod Hasharon, Israel, 2002, no date.

J. Sebastian, et al, "Improving Dynamic Response of Power Factor Correctors by Using Series–Switching Post–Regulator", Applied Power Electronics Conference and Exposition, Conference Proceedings 1998, Thirteenth Annual Anaheim, Feb. 15–19, 1998, pp. 441–446.

* cited by examiner

FIG. 2
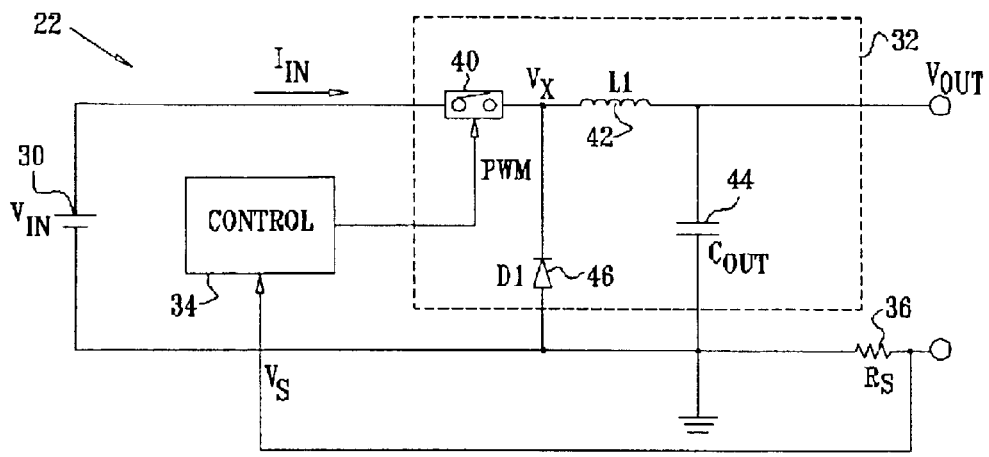
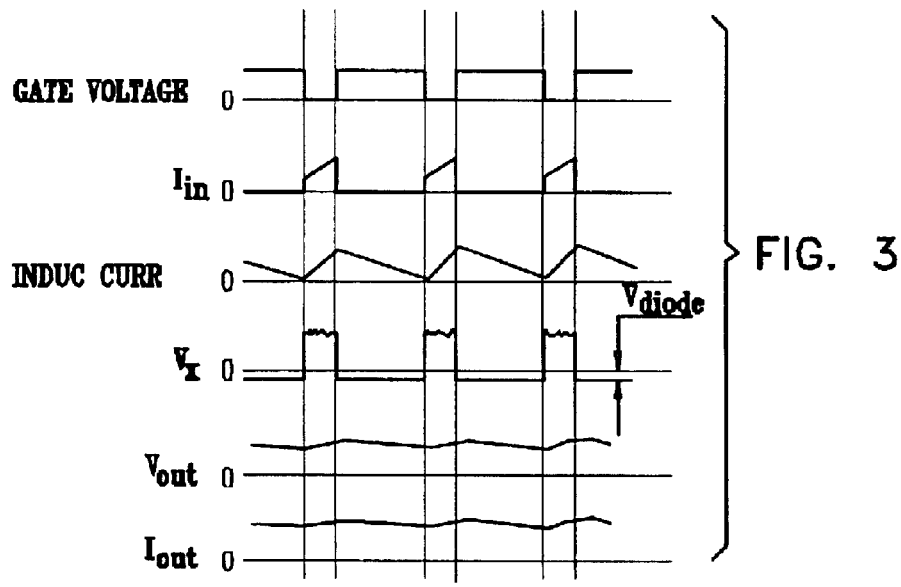
FIG. 3
FIG. 4
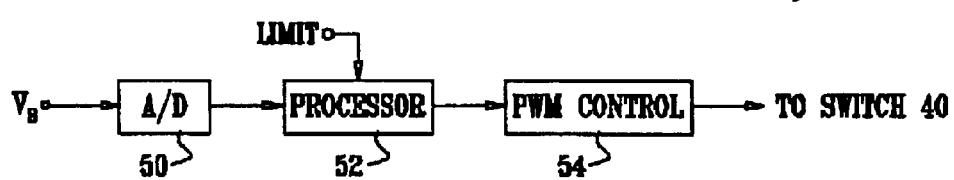

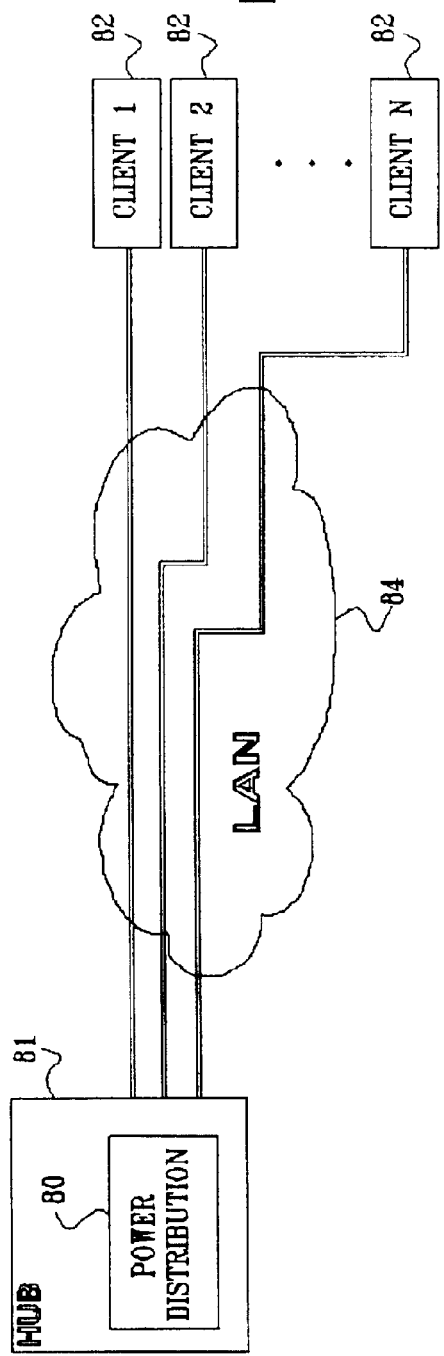
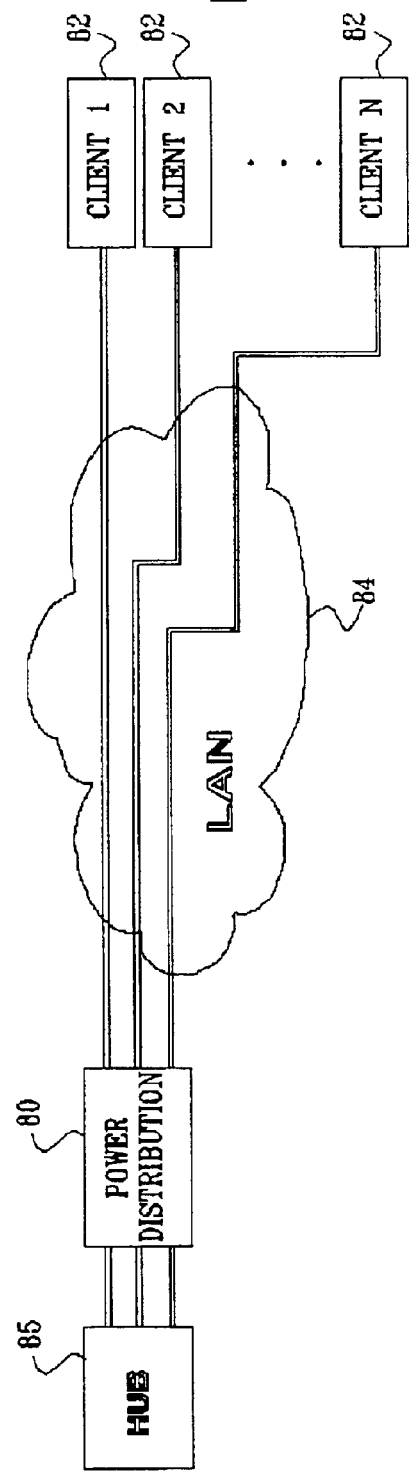

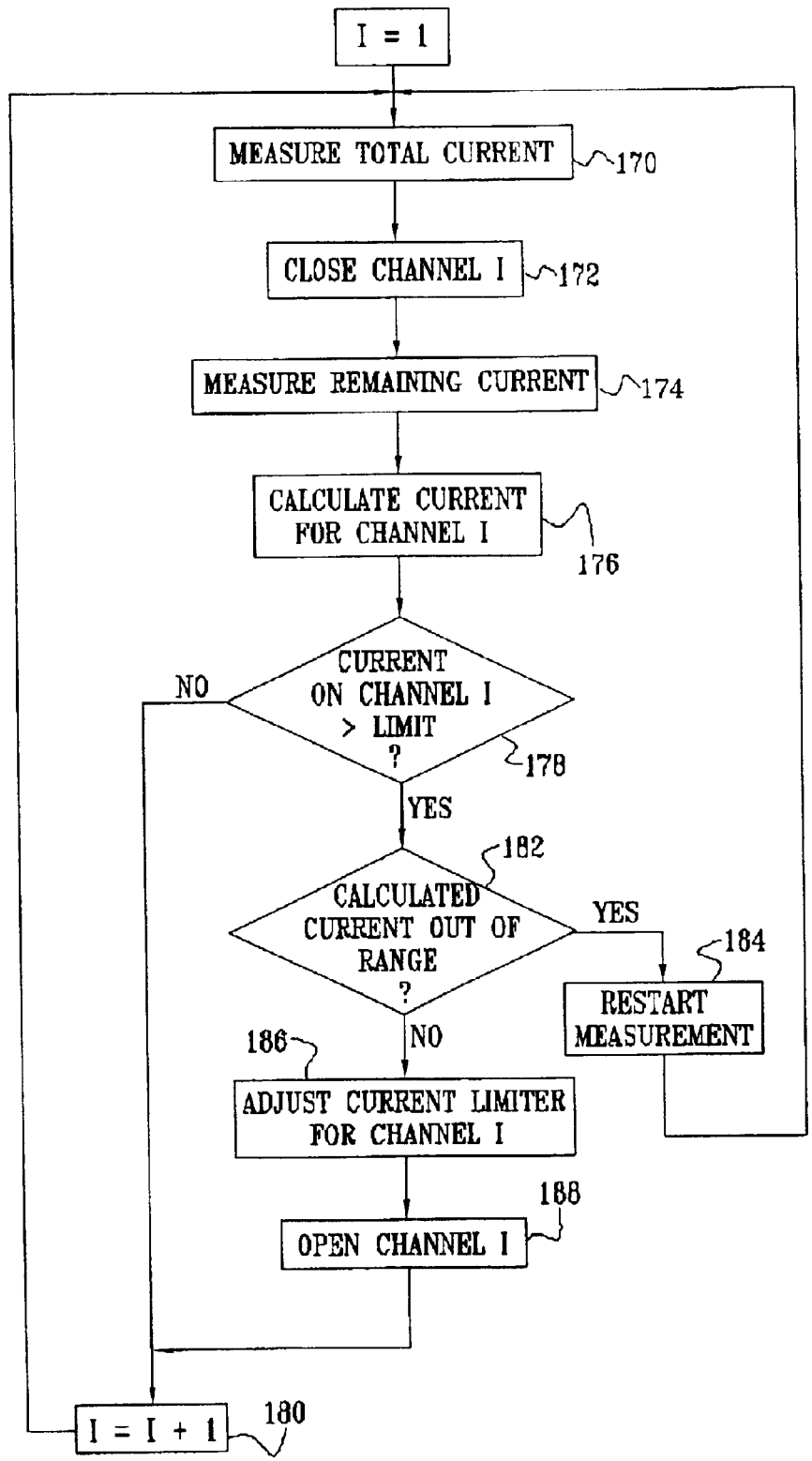

POWER DISTRIBUTION WITH DIGITAL CURRENT CONTROL

CROSS-REFERENCE TO RELATED APPLICATION

This application claims the benefit of U.S. Provisional Patent Application No. 60/292,811, filed May 22, 2001, which is incorporated herein by reference.

FIELD OF THE INVENTION

The present invention relates generally to power supplies, and specifically to methods and circuitry for avoiding current overload in the use of such power supplies.

BACKGROUND OF THE INVENTION

Power over LAN™ is a new technology that enables DC power to be supplied to Ethernet data terminals over ordinary Category 5 cabling. This technology enables the terminals to receive their operating power over the same Ethernet local area network (LAN) that they use for data communication. It thus eliminates the need to connect each terminal to an AC power socket, and to provide each terminal with its own AC/DC power converter. Further aspects of this technology are described in PowerDsine Application Note 115, entitled "Power over LAN™: Building Power Ready Devices" (PowerDsine Ltd., Hod Hasharon, Israel), which is incorporated herein by reference. The LAN MAN Standards Committee of the IEEE Computer Society is developing specifications for Power over LAN systems, as described in IEEE Draft P802.3af/D3.0, entitled "Data Terminal Equipment (DTE) Power via Media Dependent Interface (MDI)" (IEEE Standards Department, Piscataway, N.J., 2001), which is also incorporated herein by reference.

A Power over LAN system comprises an Ethernet switch and a power hub, which serves as the DC power source, along with a number of terminals, which communicate via the switch and draw power from the hub. The system is typically connected in a star topology, with each terminal linked by a dedicated cable to the switch and hub. DC power is carried to the loads (i.e., the terminals) over the twisted pairs provided by Category 5 cabling that are not needed for Ethernet data communications. The power hub may be integrated with the switch, in what is known as an "end-span" configuration, or it may alternatively be located between the switch and the terminals, in a "mid-span" configuration. These alternative configurations are illustrated on pages 16 and 17 of the above-mentioned IEEE Draft.

To avoid possible equipment damage and safety hazards, the power hub must ensure that none of the loads that it serves draws current in excess of a maximum limit. The need for such current limiting is well known in the art of DC power supplies, and is not limited to the context of Power over LAN. The most common solution for this purpose is to place a sampling resistor and a variable-impedance current-limiting element in series with the load. The sampling resistor provides a differential voltage input to an integrating amplifier, which compares the input voltage to a preset reference. The amplifier output controls the impedance of the current-limiting element, which is typically a bipolar transistor or field effect transistor (FET) operating in its linear range. A digital integrator may be used in place of the integrating amplifier.

Conventional methods for current limiting of DC power supply output have a number of drawbacks, which are particularly problematic in the context of Power over LAN:

When current limiting is needed to prevent an overload, the current-limiting element in the power supply must dissipate substantial power. Current limiting may be needed not only in fault situations, but also under certain normal operating conditions. For example, when a terminal on the LAN is initially connected or turned on, it can create a virtual short circuit while its internal power capacitor charges up. The substantial power dissipation required of the current-limiting element creates thermal problems in the hub.

Because an integrating amplifier or digital integrator is used to control the current-limiting element, the response of the element to current changes is typically slow. On the other hand, reducing the time constant of the integrator can lead to instability and oscillations of the current-limiting impedance.

All the terminals that are powered by the hub must be protected individually against over current. The cost of the hub is therefore increased by the need to provide a separate sampling resistor, current-limiting element and control circuit for each connection in the LAN. Circuits based on pulse width modulation (PWM) are commonly used in applications such as power conversion and switching power supplies. Exemplary PWM circuits and systems for such purposes are described in U.S. Pat. Nos. 5,355,077, 5,969,515, and 6,268,716, whose disclosures are incorporated herein by reference.

SUMMARY OF THE INVENTION

The present invention seeks to provide improved methods and circuits for current control, which address the problems of conventional current-limiting circuits. The methods and circuits of the present invention are particularly useful in the context of Power over LAN systems, but they are equally applicable to DC power supplies and systems of other types.

In some preferred embodiments of the present invention, a power supply comprises a voltage source with a current limiter that operates by pulse width modulation (PWM), rather than by variable impedance as in power supplies known in the art. The current limiter receives an input from a current sensor, which senses the current drawn by the load of the power supply, and varies the PWM duty cycle in order to maintain the magnitude of the current within a predetermined limit. Typically, the current limiter comprises a simple switch, such as a transistor, which is opened and closed with the proper frequency and phase to provide the desired PWM. Therefore, the power dissipation of the current limiter is minimal, even when severe current limiting must be applied. A smoothing circuit is coupled between the output of the current limiter and the load, so that the load receives DC current notwithstanding the PWM.

In further preferred embodiments of the present invention, a novel method is provided for rapid adjustment of a current-limiting element when a current overload occurs. This method is applicable both to the novel PWM-based current limiter that is described above and to current limiters based on variable-impedance elements, as are known in the art. A digital processor samples the current drawn by the load. If the current exceeds a preset maximum, the processor sets the current limiter to operate successively at first and second settings, at both of which the current passed by the current limiter is less than the current at the setting at which the overload occurred. The processor measures the current drawn at these two settings and uses the measurement to calculate the desired operating setting of the current limiter—typically the setting at which the load will draw close to the maximum current allowable, without going over. This arrangement enables the power supply to converge rapidly to the optimal operating current, without the time delay that is associated with integrating controllers.

In some preferred embodiments of the present invention, a single processor is used to control the currents supplied to multiple loads served by a single power supply, as in Power over LAN systems, for example. The processor input is multiplexed to receive a sample of the current flowing to each of the loads in turn, and the control output of the processor is likewise multiplexed among the current limiters (which may be PWM or impedance-based) serving the different loads. Preferably, a common current sensor is used to sample the current on each of the load connections in turn, most preferably in a "round robin" under the control of the processor. Sharing the current sensing and processing resources in this manner is useful in reducing the cost of the power supply.

There is therefore provided, in accordance with a preferred embodiment of the present invention, power distribution apparatus, for controlling supply of a current from an electrical power source to at least one load, the apparatus including:

a current sensor, which is coupled to provide an indication of a magnitude of the current flowing to the at least one load; and a current limiter, which is adapted, responsive to the indication, to apply a pulse width modulation to the current drawn from the source so as to maintain the magnitude of the current flowing to the at least one load within a predetermined limit.

Preferably, the current limiter includes a switch, having an input and an output, a controller, coupled to drive the switch to open and close so as to effectuate the pulse width modulation, and a smoothing circuit, coupled between the output of the switch and the at least one load. Most preferably, the switch includes a transistor, which is driven between cutoff and saturation states thereof in order to effectuate the pulse width modulation, wherein the transistor is selected from a group of devices consisting of a MOSFET, an IGBT and a bipolar transistor.

Additionally or alternatively, the controller is adapted, while the magnitude of the current is less than the predetermined limit, to hold the switch constantly closed, so that the current flows to the load substantially without applying the pulse width modulation thereto, and to drive the switch to apply the pulse width modulation to the current drawn from the source when the magnitude exceeds the predetermined limit. Preferably, the current limiter is adapted to apply the pulse width modulation with a duty cycle that is chosen so that the magnitude of the current flowing to the at least one load is approximately equal to or less than the predetermined limit.

Most preferably, the controller is adapted to drive the switch to apply the pulse width modulation with first and second trial duty cycles during respective first and second trial intervals, the controller being coupled to receive the indication of the magnitude of the current during the first and second trial intervals, the controller further being adapted to estimate, responsive to the indication, a relation between the duty cycles and the current, and to determine, based on the relation, a target duty cycle of the pulse width modulation to be applied by the current limiter so as to cause the magnitude of the current to be approximately equal to or less than the predetermined limit.

Preferably, the current sensor is adapted to provide digital samples indicative of the magnitude of the current, and the apparatus includes a controller, which is coupled to receive the digital samples and, responsive thereto, to determine a duty cycle of the pulse width modulation to be applied by the current limiter.

In a preferred embodiment, the at least one load includes a plurality of loads, the current limiter includes a plurality of current limiters, respectively coupled to apply the pulse width modulation to the respective currents, and the controller is coupled to receive the digital samples indicative of the magnitude of each of the respective currents and to determine respective duty cycles for all the current limiters responsive to the respective currents. Preferably, responsive to an overload in the current supplied to one of the loads, the controller is adapted to determine the duty cycle to be applied by the current limiter that is respectively coupled to apply the pulse width modulation to the current supplied to the one of the loads, while substantially no pulse width modulation is applied to the respective currents supplied to others of the loads for which there is no overload.

Typically, the electrical power source is coupled to supply the current to the plurality of loads over a local area network (LAN), wherein the current limiter and the current sensor are coupled to the LAN in a mid-span configuration, or are coupled to the LAN together with a switching hub in an end-span configuration.

In a further preferred embodiment, the source of electrical power is adapted to supply respective currents to a plurality of loads, and the current limiter includes a plurality of current limiters, respectively coupled to apply the pulse width modulation to the respective currents, and the current sampler is adapted to sample each of the loads in alternation, and to supply the indication with respect to the magnitude of each of the respective currents for use in controlling the current limiters.

There is also provided, in accordance with a preferred embodiment of the present invention, power distribution apparatus, for controlling supply of a current from an electrical power source to at least one load, the apparatus including:

a current limiter, which is coupled to controllably reduce a magnitude of the current supplied to the at least one load;

a current sensor, which is coupled to provide an indication of a magnitude of the current flowing to the at least one load; and a controller, which is coupled to set the current limiter to an initial setting and to receive the indication from the current sensor of the magnitude of the current, the processor being adapted, responsive to the indication, to determine whether the magnitude of the current at the initial setting exceeds a predetermined maximum and if so, to set the current limiter to operate at first and second settings at which the current passed by the current limiter is less than the current at the initial setting, and to determine, using the current sensor, first and second magnitudes of the current at the first and second settings, respectively, of the current limiter, the controller being further adapted to determine a current limiting characteristic based on the first and second magnitudes, and to select a target setting of the current limiter responsive to the estimated current limiting characteristic, so as to reduce the magnitude of the current to less than the predetermined maximum.

There is additionally provided, in accordance with a preferred embodiment of the present invention, power distribution apparatus, for controlling supply of respective currents from an electrical power source to multiple loads, the apparatus including:

a plurality of current limiters, which are coupled to controllably reduce respective magnitudes of the currents supplied to the loads;

a current sensor, which is coupled to measure in alternation the respective currents supplied to all the loads; and a controller, which is coupled to receive measurements of all the respective currents from the current sensor and, responsive thereto, to set the respective current limiters so as to maintain the currents supplied to the loads within a predetermined range.

There is further provided, in accordance with a preferred embodiment of the present invention, a method for controlling supply of power to at least one load, including:

measuring a magnitude of the current flowing from a power source to the at least one load; and responsive to the measured magnitude, applying a pulse width modulation to the current drawn from the at least one load so as to maintain the magnitude of the current flowing to the at least one load within a predetermined limit.

There is moreover provided, in accordance with a preferred embodiment of the present invention, a method for controlling supply of power to at least one load, including:

supplying a current to the at least one load through a current limiter at an initial setting of the current limiter;

sampling the current to determine whether an initial magnitude of the current exceeds a predetermined maximum;

if the current exceeds the predetermined maximum, sampling the current to determine first and second magnitudes thereof at first and second settings, respectively, of the current limiter, at which first and second settings the current passed by the current limiter is less than the current at the initial setting;

estimating a current limiting characteristic based on the first and second magnitudes; and selecting a target setting of the current limiter responsive to the estimated current limiting characteristic, so as to reduce the magnitude of the current to less than the predetermined maximum.

Preferably, the method includes sampling the current at the target setting to determine a new magnitude of the current, and adjusting the setting of the current limiter responsive to the new magnitude until the sampled current converges to a predetermined range. Most preferably, adjusting the setting includes using the new magnitude of the current determined at the target setting to revise the estimated current limiting characteristic, and selecting a new target setting of the current limiter based on the revised estimated characteristic.

In a preferred embodiment, the method includes determining a temperature of the current limiter while sampling the current, and saving the estimated current limiting characteristic for use in selecting the target setting on a future occasion upon which the current exceeds the predetermined maximum and the current limiter is operating at the determined temperature.

Additionally or alternatively, sampling the current at the target setting, and restoring the initial setting of the current limiter if the current is below a predetermined minimum. Most preferably, sampling the current includes sampling the current after a predetermined delay, and the method includes shutting off the current to the load if the current has not dropped below the predetermined minimum.

In a preferred embodiment, the current limiter includes a variable-impedance device, and the first and second settings correspond respectively to first and second impedance settings. Preferably, the variable-impedance device includes a transistor, and the first and second impedance settings correspond respectively to first and second gate voltages applied to the transistor.

In another preferred embodiment, the current limiter includes a pulse width modulator, which is coupled to apply pulse width modulation to the current supplied to the load, and the first and second settings correspond respectively to first and second duty cycles of the pulse width modulation. Preferably, estimating the current limiting characteristic includes determining fitting parameters so as to fit a curve to the first and second magnitudes as a function of the first and second settings.

In a further preferred embodiment, supplying the current includes supplying respective currents to a plurality of loads through respective current limiters, and estimating the current limiting characteristic includes using a single digital processor to estimate respective current limiting characteristics for two or more of the current limiters. Preferably, sampling the current includes sampling the respective currents supplied to the plurality of loads using a single current sensing device to determine and provide the magnitudes of the respective currents to the digital processor.

Typically, supplying the respective currents includes supplying the currents to the plurality of loads over a local area network (LAN).

There is furthermore provided, in accordance with a preferred embodiment of the present invention, a method for supplying power to multiple loads, including:

coupling a power supply to supply respective currents to all the loads through respective current limiters;

measuring the respective currents in alternation using a common current sensor for all the loads; and setting the respective current limiters responsive to the measured currents, so as to maintain the currents supplied to the loads within a predetermined range.

Preferably, measuring the respective currents includes alternating among the multiple loads in a round robin.

In a preferred embodiment, measuring the respective currents includes selecting one of the currents to measure, interrupting the currents other than the selected current, and measuring the current using the common current sensor while the other currents are interrupted.

In another preferred embodiment, measuring the respective currents includes selecting one of the currents to measure, making a first measurement of all the currents together using the common current sensor, interrupting the selected current, making a second measurement of all the currents together using the common current sensor while the selected current is interrupted, and taking a difference between the first and second measurements in order to measure the selected current.

In one embodiment, the current limiters include variable-impedance devices, and setting the respective current limiters includes applying respective impedance settings to the devices. In an alternative embodiment, the current limiters include pulse width modulators, which are coupled to apply pulse width modulation to the respective currents supplied to the loads, and setting the respective current limiters includes setting respective duty cycles of the pulse width modulators.

The present invention will be more fully understood from the following detailed description of the preferred embodiments thereof, taken together with the drawings in which:

BRIEF DESCRIPTION OF THE DRAWINGS

FIG. 2 is a schematic circuit diagram showing current control circuitry used in a power distribution unit, in accordance with a preferred embodiment of the present invention;

FIG. 3 is a timing diagram that schematically illustrates waveforms generated in the circuitry of FIG. 2;

FIG. 4 is a block diagram that schematically shows details of a pulse width modulation (PWM) controller used in the control circuitry of FIG. 2;

FIGS. 6A and 6B are block diagrams that schematically illustrates master power distribution units serving multiple clients, in accordance with preferred embodiments of the present invention;

FIG. 16 is a flow chart that schematically illustrates a method for controlling current output by a master power distribution unit to multiple clients, in accordance with another preferred embodiment of the present invention.

DETAILED DESCRIPTION OF PREFERRED EMBODIMENTS

Figure 1:
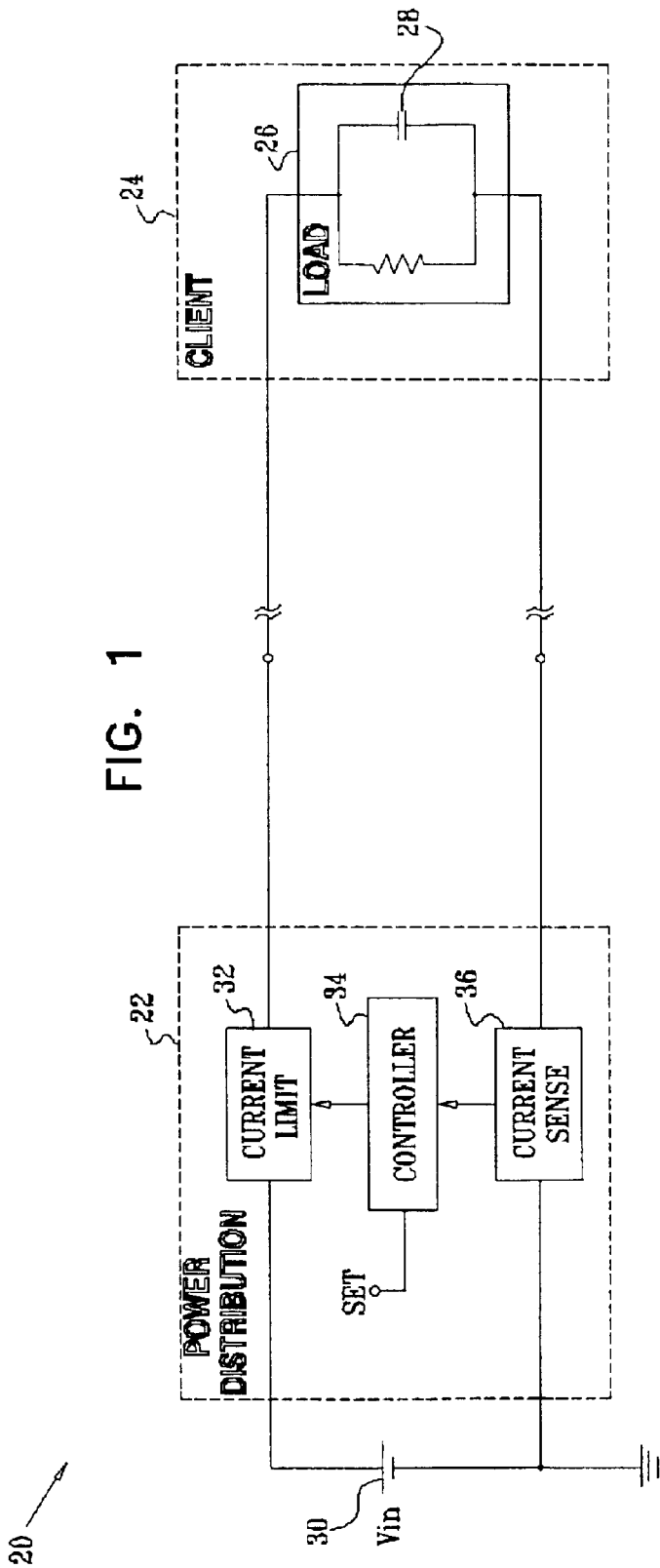
FIG. 1 is a block diagram that schematically illustrates a power distribution unit serving a load, in accordance with a preferred embodiment of the present invention.

FIG. 1 is a block diagram that schematically illustrates a power supply system 20 with digital current control, in accordance with a preferred embodiment of the present invention. For the sake of simplicity, system 20 is shown as comprising a master power distribution unit 22, which provides DC power to a single client 24. In practical applications, particularly in the context of Power over LAN systems, master power distribution unit 22 may serve as a power hub, to provide power to multiple clients, such as Ethernet terminal devices receiving power from the hub over a LAN. Unit 22 may be integrated with the LAN in either a mid-span or an end-span configuration (as shown below in FIGS. 6A and 6B). Some aspects of the present invention are applicable both to such multi-client environments and to power supplies that drive a single load, as shown in FIG. 1. Other aspects of the present invention, described with reference to certain of the figures that follow, provide solutions that are specific to multi-client applications.

Client 24 is shown here as comprising a load 26, which typically comprises, for example, operating circuits of a terminal device and a storage capacitor 28. The capacitor ensures that once the circuits are up and running, they receive a smooth supply of current at constant voltage, notwithstanding any transient fluctuations that may occur in delivery of power from master power distribution unit 22. When client 24 is first turned on, capacitor 28 will draw a high current from unit 22, until the capacitor is charged to the full supply voltage. Thereafter, if client 24 draws a current that is outside the operating normal range expected of load 26, the overload current is probably due to a short circuit or other malfunction.

Master power distribution unit 22 should therefore be designed to allow client 24 to draw a high current for a limited period, during which capacitor 28 is charging, but to shut off current to the client if the high current persists for too long, or if the current exceeds some maximum level. (This function is commonly known as "inrush current limiting.") Typically, as described in the above-mentioned Application Note, a cutoff current level, $I_{CUT}$, and a time limit, $T_{CUT}$, are defined, such that if the current drawn by client 24 exceeds $I_{CUT}$ for a period longer than $T_{CUT}$, the current to the client is shut off. A higher current limit level, $I_{LIM}$, is also defined, such that if the current drawn by the client exceeds $I_{LIM}$ for any period of time, the current is likewise limited or shut off. In other words, even during the inrush current period, the load current is not allowed to exceed $I_{LIM}$. Typically, $I_{CUT}$ is set to be ¾ of $I_{LIM}$, with the actual values chosen for these parameters depending on the particular characteristics of power distribution unit 22 and client 24. Exemplary values of these parameters in a Power over LAN system supplying 48 VDC are $I_{LIM}$=500 mA, $I_{CUT}$=350 mA and $T_{CUT}$=50 ms.

The elements of master power distribution unit 22 that are used to implement these current limiting functions are shown generally in FIG. 1. Unit 22 receives current from a power source 30, which supplies a constant DC input voltage, $V_{IN}$, typically 48 V, as noted above. A current limiter 32 maintains the current drawn from source 30 by client 24 within the appropriate limits, preferably using a method of pulse width modulation (PWM), which is described in detail hereinbelow. The operation of limiter 32 is regulated by a digital controller 34, based on an input provided by a current sensor 36. The controller compares the current level determined by sensor 36 to preset values of $I_{CUT}$ and $I_{LIM}$, and controls limiter 32 accordingly.

For convenience of illustration, current limiter 32 is shown in FIG. 1 to be connected on the positive supply line between power source 30 and client 24, while current sensor 36 is located on the ground return. In practice, however, both the current limiter and the current sensor may be located on either the positive supply line or the ground return, in any combination. The location of the current limiter and the current sensor on one or the other of these lines in the figures that follow is chosen solely for purposes of illustration and not by way of limitation.

FIG. 2 is a schematic circuit diagram showing details of master supply 22, in accordance with a preferred embodiment of the present invention. Current limiter 32 comprises a switch 40, which opens and closes under the control of a PWM waveform provided by controller 34. Typically, switch 40 comprises a transistor, preferably a MOSFET device, such as an IRLR130AT device, produced by Fairchild Semiconductor. Alternatively, switch 40 may comprise a bipolar transistor, such as the Fairchild TIP117, or an IGBT device, such as the Fairchild FGB20N6S2D. The PWM waveform is applied to the gate of the device in order to drive it between cutoff and saturation states with a duty cycle set by controller 34. Controller 34 determines the PWM duty cycle depending on a sense voltage $V_S$ provided by current sensor 36, which is implemented here as a resistor $R_S$. An inductor 42 (typically 150 μH, 1 A), a capacitor 44 (220 μF, 100V) and a diode 46 (US1G type) are used to rectify and smooth the output of switch 40.

Limiter 32 has three different operating modes. In the off mode, switch 40 is open, so that load 26 is disconnected from power source 30. This mode is used when client 24 is not operating, or when power to the client is shut off for various reasons, such as an overload or a command or logic output indicating that the client should not receive power. In the normal operating mode, on the other hand, switch 40 is closed, and a continuous current flows through load 26. Ignoring negligible voltage drops over switch 40 and inductor 42, the voltage supplied to load 26, $V_{OUT}$, is nearly equal to the input voltage under these conditions:

$$V_{OUT}=V_{IN}-I_{LOAD}\times R_S,$$

since typically $R_S<<R_{LOAD}$. Controller 34 monitors $V_S=I_{LOAD}\times R_S$. As long as $I_{LOAD}$ stays within the $I_{LIM}$ and $I_{CUT}$ criteria noted above, the controller allows normal operation to continue.

When controller 34 determines that client 24 is drawing excessive current, it switches to the current-limiting mode. In this mode, the controller drives switch 40 to apply PWM to the supply current $I_{IN}$, so that limiter 32 reduces the output voltage $V_{OUT}$ to the client. If the overload current is due to charging of capacitor 28, reducing the output voltage will resolve the over-current. After sufficient time has passed for the capacitor to charge, controller 34 will return limiter 32 to the normal operating mode, in which switch 40 is constantly closed. If reducing the output voltage does not resolve the overload current within a sufficient period of time, due to a short circuit, for example, controller 34 may turn switch 40 off.

FIG. 3 is a timing diagram that schematically shows waveforms generated at different points in supply 22 shown in FIG. 2, while limiter 32 is operating in the current limiting mode. When switch 40 is closed, the voltage difference $V_X=V_{OUT}-V_{IN}$ is applied across inductor 42, causing a linearly-increasing current to flow through the inductor, as shown in the figure. When the switch is opened, the inductor current continues to flow, now linearly decreasing, with diode 46 completing the circuit. Capacitor 44 acts as an energy "flywheel," smoothing the sawtooth ripple of the inductor current. The level of the output current to the load is determined by the duty cycle of switch 40:

$$I_{LOAD}=V_{IN}\times DutyCycle/R_{LOAD}.$$

Controller 34 determines the load current from the sample voltage $V_S$, as described above, and sets the duty cycle in order to maintain the load current within the applicable limits.

Note that under all conditions, switch 40 is either fully open or fully closed. In either of these states, the power dissipation of the switch is far less than that of a current-limiting transistor operating in its linear region. Therefore, power distribution unit 22 limits the current supplied to the load with much greater efficiency and far fewer thermal problems than current limiters known in the art.

FIG. 4 is a block diagram that schematically shows details of controller 34, in accordance with a preferred embodiment of the present invention. The sense voltage $V_S$ is sampled and digitized by an analog/digital (A/D) converter 50, which provides the digital sample values to an embedded processor 52. This processor may be implemented either as a programmable microprocessor with suitable software, or as hard-wired logic. By comparing the sample values to one or more preset limit values, processor 52 determines a target duty cycle value, between 0 and 100%. It inputs this value to a PWM controller 54, which generates a square wave with the desired duty cycle, to drive the gate of switch 40. As processor 52 continues to monitor the sample values, it may increase or decrease the duty cycle value as necessary to maintain the current $I_{LOAD}$ within the desired operating range.

Figure 5:
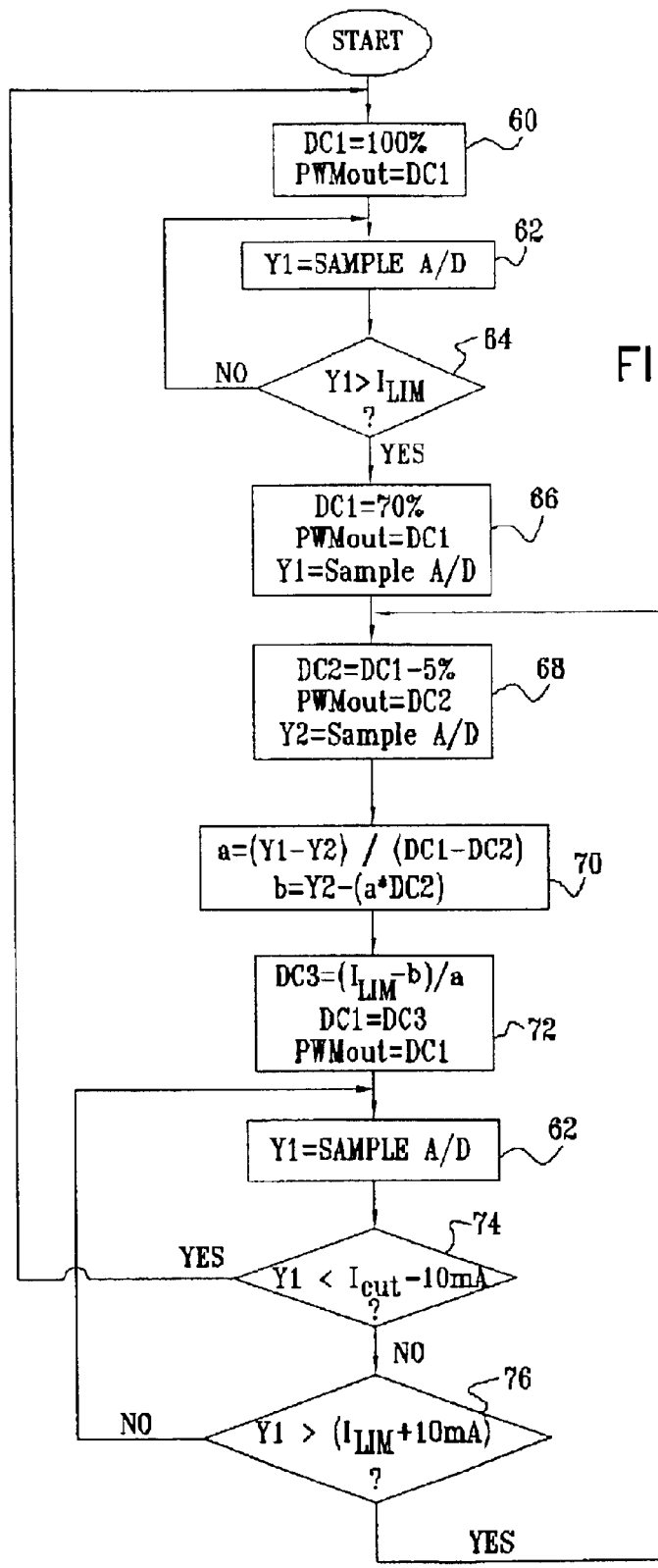
FIG. 5 is a flow chart that schematically illustrates a method for setting a PWM duty cycle used for current control, in accordance with a preferred embodiment of the present invention.

FIG. 5 is a flow chart that schematically illustrates a method implemented by processor 52 for determining the duty cycle to be applied by PWM controller 54, in accordance with a preferred embodiment of the present invention. This method is advantageous in terms of speed of convergence, but other methods may also be applied for determining the PWM duty cycle, as will be apparent to those skilled in the art. The present method uses duty cycle values referred to hereinbelow as DC1, DC2 and DC3, as well as sampled values of $V_S$—referred to as Y1 and Y2—which are provided by A/D converter 50. The duty cycle values and sample values are stored in internal registers of processor 52, as are the current limit values $L_{LIM}$ and $I_{CUT}$.

At an initial step 60, DC1 is set to 100%, and this duty cycle value is fed to PWM controller 54, so that switch 40 is continuously closed. The controller receives and saves sample values from A/D converter 50, at a sampling step 62, and compares the values to $I_{LIM}$, at a limit checking step 64. As long as the sample values do not exceed the limit, switch 40 remains closed.

If the sample values exceed $I_{LIM}$, processor 52 initiates a curve-fitting procedure to determine how far the PWM duty cycle should be reduced. It is assumed for this purpose that the current $I_{LOAD}$ is approximately linearly dependent on the duty cycle, i.e., that $I_{LOAD}\approx a\times DutyCycle+b$. Thus, by determining the values of the constants a and b, the processor can rapidly find the duty cycle setting for PWM controller 54 that will give the desired load current. To determine a and b, processor 52 sets the duty cycle of the PWM controller to two different trial values, for example, a first value DC1= 70%, at a first trial step 66, and a second value DC2 that is 5% less than the first value, at a second trial step 68. At each of these steps, the processor receives and saves the value of the sample voltage $V_S$ provided by A/D converter 50, in registers Y1 and Y2. The processor calculates the values of a and b based on the measured values of Y1 and Y2, together with the known duty cycles DC1 and DC2, at a fitting step 70. The duty cycle setting that is expected to give $I_{LOAD}= I_{LIMIT}$ is then determined, at a duty cycle setting step 72, to be DC3=($I_{LIM}$-b)/a. This setting should allow client 24 to draw the maximum permissible current.

To check that the duty cycle has been set correctly, sampling step 62 is preferably repeated, and the sample value is compared to the lower limit $I_{CUT}$, at a lower limit checking step 74. If the sample value is below $I_{CUT}$, it means that the current overload has been resolved. (Preferably, the lower limit is actually set a bit below $I_{CUT}$, say 10 mA below a typical $I_{CUT}$ level of 350 mA, to ensure that $I_{LOAD}$ is below the overload range.) In this case, processor 52 returns the duty cycle setting to 100% for normal operation, and the procedure continues back at step 60.

If the sample value is greater than the lower limit at step 74, it is compared to the upper limit, $I_{LIM}$, at an upper limit checking step 76. In this case, the limit used for comparison is preferably slightly greater than $I_{LIM}$, in order to maintain stability and avoid oscillations due to noise or other perturbations. If the sample value is below the limit, processor 52 concludes that the load current is within the legal overload range. As long as this is the case, the processor continues to repeat steps 62, 74 and 76, until either the overload is resolved at step 74, or it becomes exacerbated at step 76.

If the sample value evaluated at step 76 is greater than the upper limit, the fitting process of steps 68, 70 and 72 is repeated in order to find the correct duty cycle setting, which is presumably lower than the current setting. In this case, the current duty cycle setting and the corresponding sample value can be used as the first data point (DC1, Y1), so that it is not necessary to repeat step 66. Only the second data point (DC2, Y2) need be sampled, at step 68. (Alternatively, the current duty cycle setting with its corresponding sample value could be used together with the previous data points to refine the fitting process, so that step 68 could be skipped as well.) New fitting parameters a and b are then determined at step 70, leading to setting a new duty cycle value at step 72. Optionally, multiple data points (DCx, Yx) can be used to perform a quadratic or higher-order fitting procedure, in order to find an optimal duty cycle value.

FIGS. 6A and 6B are block diagrams that schematically illustrate Power over LAN systems based on the principles described above. Here, a master power distribution unit 80 provides DC power to multiple clients 82 over a LAN 84. FIG. 6A shows an end-span configuration, in which unit 80 is integrated with a switching hub 81, while FIG. 6B shows a mid-span configuration, in which unit 80 is located between a switching hub 85 and clients 82. In either case, unit 80 may be implemented simply by replicating current sensor 36, controller 34 and current limiter 32, as described above, for each client 82 served by the master power distribution unit. Preferably, however, in order to reduce the cost of the unit, some of the functions of these elements are shared among the connections serving the different clients.

Figure 7:
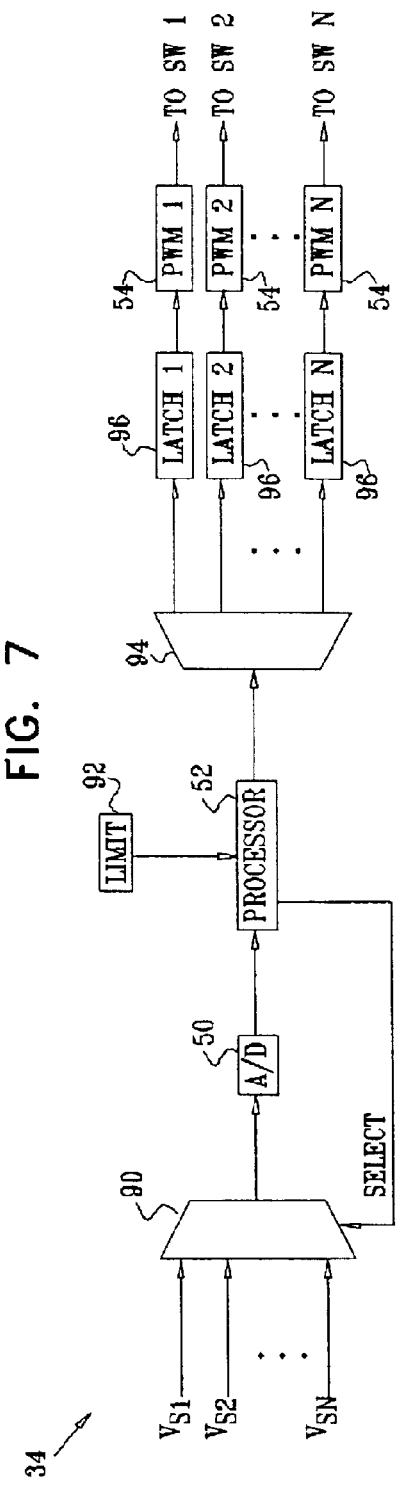
FIG. 7 is a block diagram that schematically illustrates current control circuitry used in the master power distribution units of FIGS. 6A and 6B, in accordance with a preferred embodiment of the present invention.

FIG. 7 is a block diagram that schematically shows details of one such sharing scheme, in accordance with a preferred embodiment of the present invention. In this embodiment, A/D converter 50 and processor 52 in controller 34 are multiplexed to serve multiple connections. An analog multiplexer 90 receives sense voltages $V_{S1}, V_{S2}, \ldots, V_{SN}$ from respective current sensors 36 on the different connections. (As shown in FIG. 14, it is also possible for a single current sensor to be shared among the connections.) Processor 52 selects each of the multiplexer inputs in turn, preferably in a round robin, in order to sample and evaluate the load current level on all the connections. The measured current levels are compared to respective limit values, which may be all the same or different for the different connections. Based on the current levels and limits, processor 52 determines the appropriate duty cycle value to be applied to each connection.

A demultiplexer 94 passes the duty cycle values from processor 52 to respective latches 96. In this embodiment, each connection has its own PWM controller 54, which generates the appropriate square wave based on the duty cycle value in the respective latch. These square waves are used to drive the current-limiting switches on the different connections.

Figure 8:
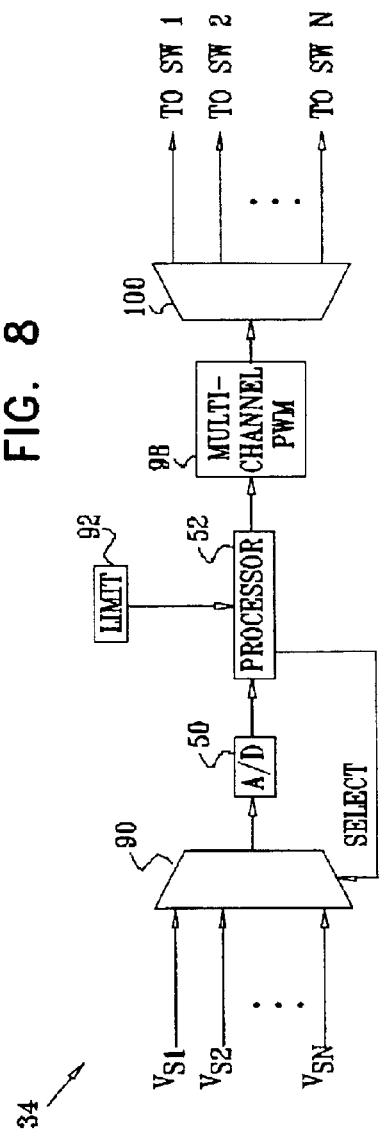
FIG. 8 is a block diagram that schematically illustrates current control circuitry used in the master power distribution units of FIGS. 6A and 6B, in accordance with another preferred embodiment of the present invention.

FIG. 8 is a block diagram that schematically illustrates another sharing scheme, in accordance with an alternative embodiment of the present invention. In this case, a multi-channel PWM controller 98 is used to drive the current-limiting switches on multiple channels, via a demultiplexer 100. This embodiment is based on the observation that under typical operating conditions, most of clients 82 are either shut off or operating normally, and no more than one or a few clients are likely to be in the current-limiting mode. Thus, when processor 52 detects a current overload on one of the connections, it determines the appropriate duty cycle to apply to the particular connection and passes the duty cycle value to controller 98. Demultiplexer 100 couples the square wave that is output by controller 98 to the current-limiting switch of the appropriate connection. The remaining switches are latched in either the normal on or off mode as appropriate.

In the embodiment of FIG. 8, processor 52 should also be programmed to deal with unusual situations in which overload conditions occur on two or more connections simultaneously. One possibility in this case is to switch demultiplexer 100 rapidly between the different connections that must be serviced. Another option is to service only one of the overloaded connections, while temporarily shutting down the others. Alternative solutions will be apparent to those skilled in the art.

Figure 9:
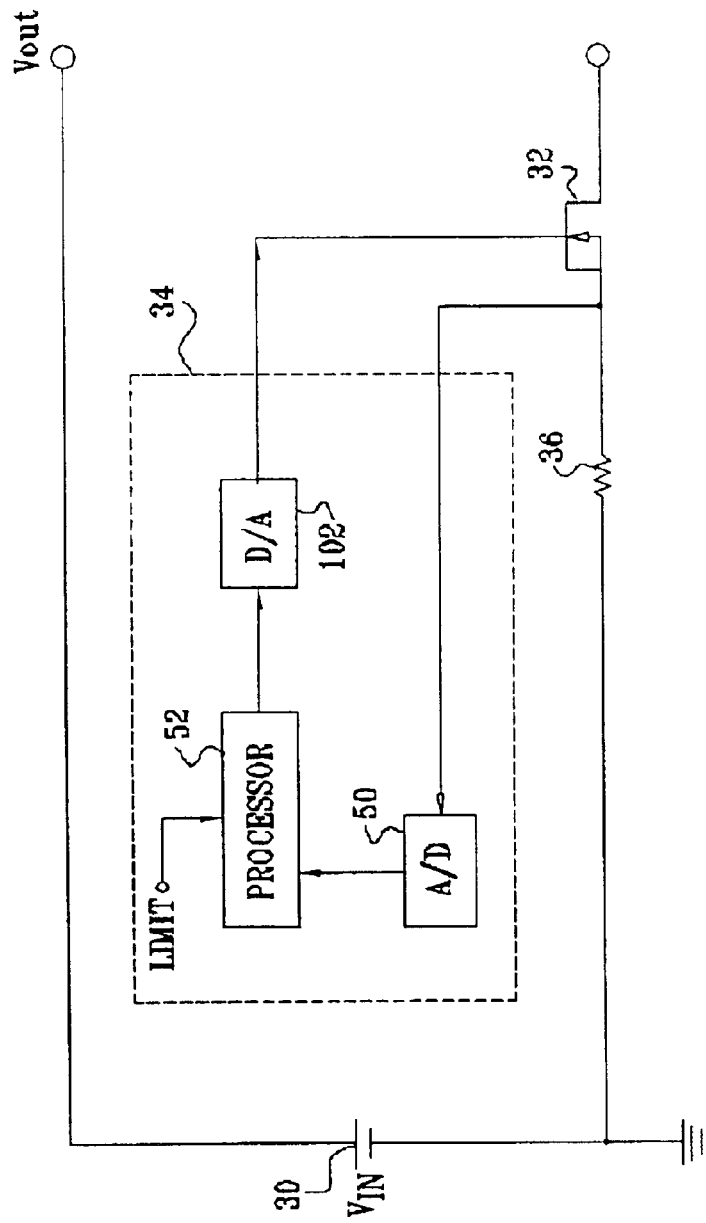
FIG. 9 is a schematic diagram showing current control circuitry used in a power distribution unit, in accordance with a further preferred embodiment of the present invention.

FIG. 9 is a schematic circuit diagram showing details of master supply 22, in accordance with another preferred embodiment of the present invention. Current limiter 32 in this case comprises a variable-impedance device, such as a FET, placed in series with the load, as shown in FIG. 1. A/D converter 50 samples and digitizes the sense voltage $V_S$ provided by current sensor 36, which is in this example implemented as a series resistor. Processor 52 performs a curve-fitting operation, similar to that described above with reference to FIG. 5, in order to determine the optimal operating point of limiter 32. The processor outputs this operating point as a digital control value to a digital/analog (D/A) converter 102, which converts the digital value to the proper analog gate voltage to drive limiter 32.

Figure 10:
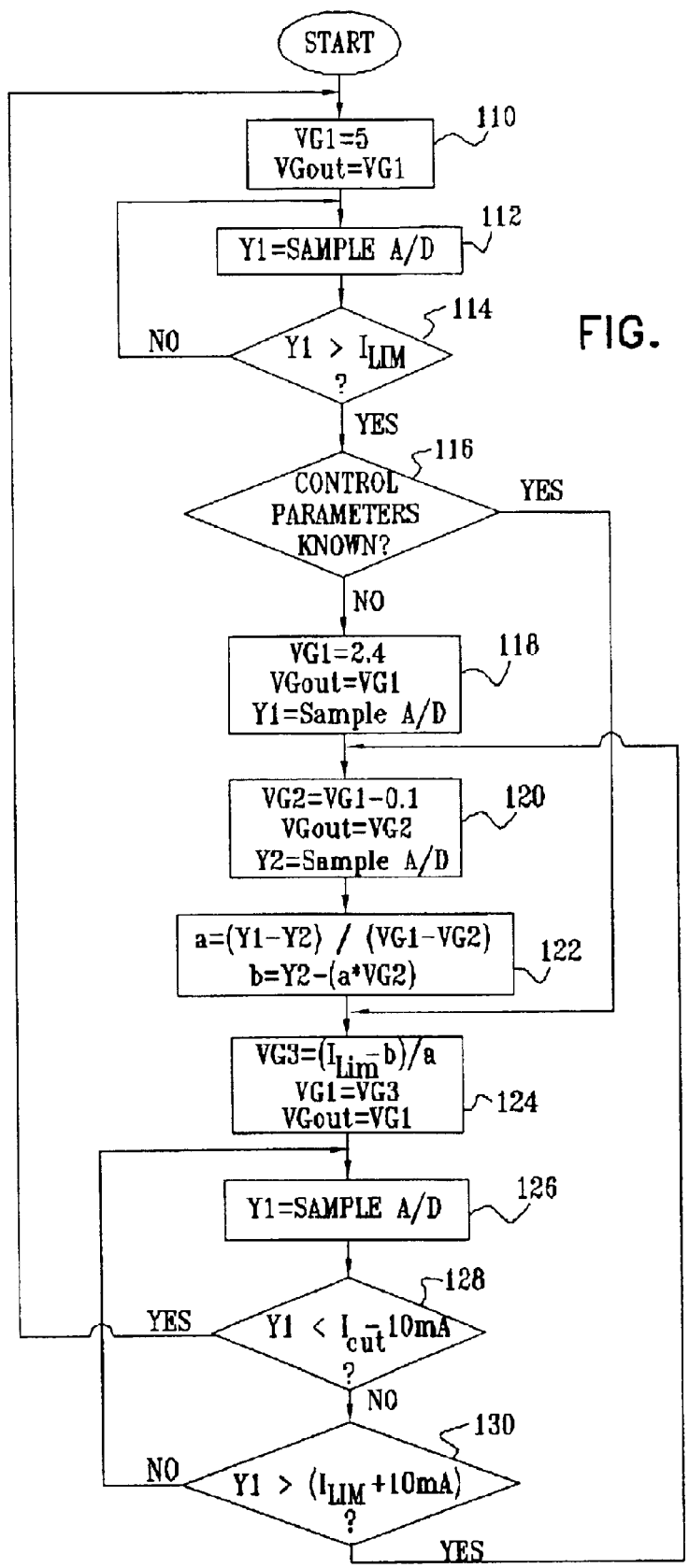
FIG. 10 is a flow chart that schematically illustrates a method for controlling current output by a power distribution unit, in accordance with a preferred embodiment of the present invention.
Figure 12:
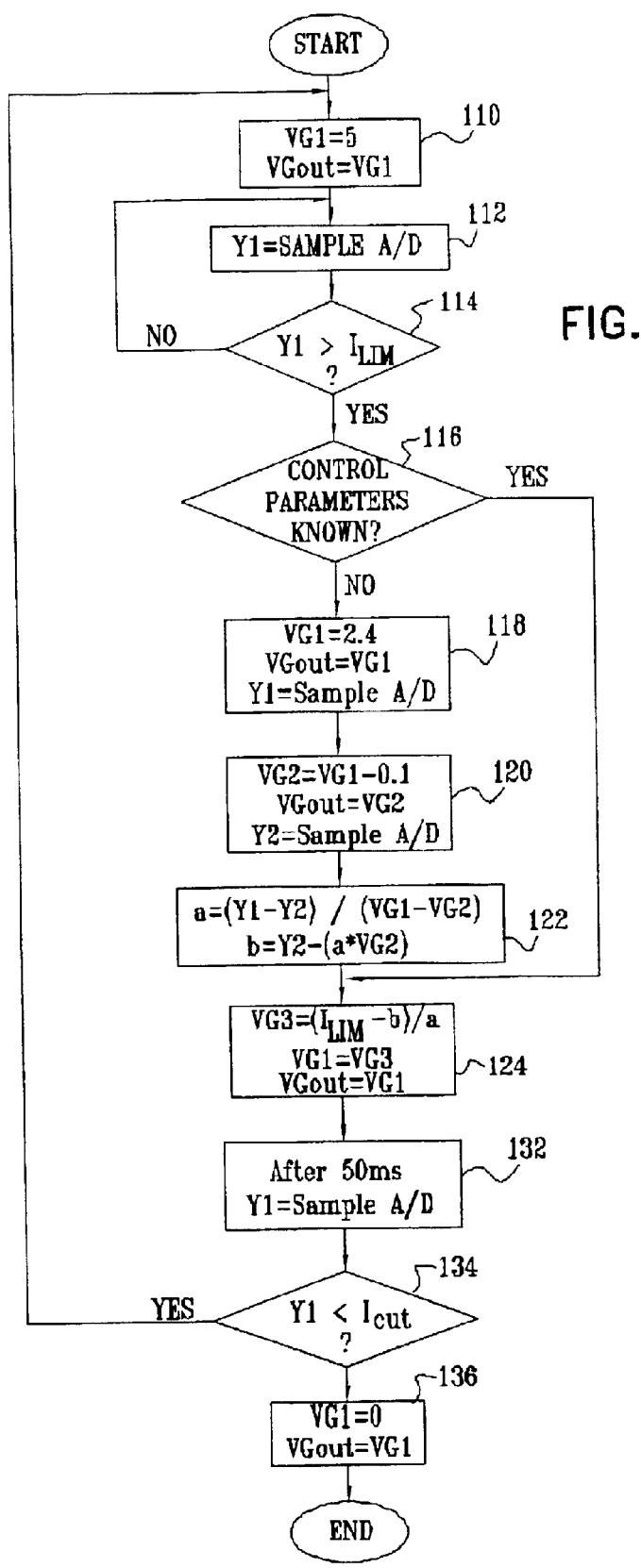
FIG. 12 is a flow chart that schematically illustrates a method for controlling current output by a power distribution unit, in accordance with another preferred embodiment of the present invention.

The curve fitting procedure, which is described below with reference to FIGS. 10 and 12, is preferably based on measurements of the load current (represented by $V_S$) at two different operating points of limiter 32. This fitting strategy assumes that the limiter is operating in a linear range, i.e., at a gate voltage substantially below the saturation level. Alternatively, three or more operating points may be evaluated in order to perform a higher-order fit, and/or to increase the confidence of measurement. Appropriate methods of curve fitting and of setting the operating point of the limiter based on the fitting parameters will be apparent to those skilled in the art.

The fitting parameters determined for a given limiter 32 may be stored and reused during subsequent operation of supply 22, as long as the underlying characteristics of the limiter do not change. It is well known, however, that the transfer characteristics of most transistors do vary as a function of temperature (as well as of other factors, such as aging). This problem may be overcome by carefully controlling the temperature of supply 22. Alternatively, a temperature sensor (not shown) may be placed in supply 22, near the location of limiter 32, and the fitting parameters for the limiter may be determined and stored as a function of the temperature. Thereafter, when it is necessary to activate limiter 32, processor 52 checks the temperature and looks up the necessary parameters on this basis.

FIG. 10 is a flow chart that schematically illustrates a method implemented by processor 52 for setting the operating point of limiter 32, in accordance with a preferred embodiment of the present invention. For the sake of clarity, it is assumed here that the limiter is a FET, and that the operating point corresponds to the FET gate voltage (VG). In a manner similar to the method of FIG. 5, processor 52 uses internal registers VG1, VG2 and VG3 to hold gate voltage values that it uses in its fitting and control operations, and registers Y1 and Y2 to hold sampled values of the sense voltage $V_S$ provided by sensor 36 via A/D converter 50. Although this method is described here with reference to FET operating parameters, adaptation of the method for use in determining and setting operating parameters of other types of current limiters is straightforward.

Upon initiation of the operation of supply 22, the gate voltage of limiter 32 is set high, typically to a value VG1=5 V, at an initial setting step 110. At this value, the resistance of the limiter is near zero, so that the current flow to the load is fully on. Processor 52 samples the sense voltage, at a sampling step 112, and compares the sampled value to the current limit $I_{LIM}$, at a comparison step 114. As long as the sampled value is below the level of $I_{LIM}$, the gate voltage remains at its starting value, and steps 112 and 114 are repeated continually.

If the sampled value of the sense voltage exceeds $I_{LIM}$, processor 52 checks to determine whether the fitting parameters for limiter 32 are already known, at a parameter recall step 116. If the parameters are not known, the processor must perform a curve fitting procedure in order to calculate them. For this purpose, the gate voltage is set to two different trial values, substantially lower than the starting value, at first and second trial steps 118 and 120. For example, at step 118, the gate voltage may be set to VG1=2.4 V, while at step 120, the gate voltage is set to VG2=VG1−0.1 V. The sense voltage is sampled at both these operating points, and the resulting measurements, Y1 and Y2, are used to calculate the linear fitting parameters a and b, at a fitting step 122. These values of a and b are used to determine the appropriate gate voltage VG3 to use for optimal performance of supply 22, at a target voltage setting step 124.

Alternatively, if processor 52 finds at step 116 that the values of a and b are already known (taking into account any temperature dependence, as noted above), it recalls these values from its memory and jumps directly to step 124. In either case, the gate voltage is preferably set at step 124 so that the output current $I_{LOAD}$ drawn from supply 22 is close to the limit $I_{LIM}$.

After setting the gate voltage to the desired target value, processor 52 again samples the sense voltage, at a resampling step 126. Based on the sample value, the processor checks to determine whether the load current has now dropped below the level of $I_{CUT}$−10 mA, at a lower limit checking step 128, as in the method of FIG. 5. If so, it means that the overload situation has evidently been resolved, and processor 52 returns limiter 32 to its original, low-impedance state, at step 110. If not, the processor checks the sense voltage sample value against $I_{LIM}$, at an upper limit checking step 130. Preferably, a hysteresis factor is added to $I_{LIM}$ (10 mA in the present example) to maintain loop stability and avoid oscillations. As long as the load current is below this limit, processor repeats steps 126, 128 and 130 until the current overload is resolved, such that the load current drops below $I_{CUT}$.

If the load current is found at step 130 to be over the upper limit, the curve fitting process is repeated in order to find better values of the fitting parameters a and b. The present value of the gate voltage (VG3) and the sense voltage sample value actually measured at this gate voltage can be used as one data point for the purposes of fitting, so that step 118 can now be skipped. A second data point is found at step 120, and the new values of a and b are determined, based on the two data points, at step 122. These values are used to set a new gate voltage at step 124. The method then continues as described above.

Figure 11:
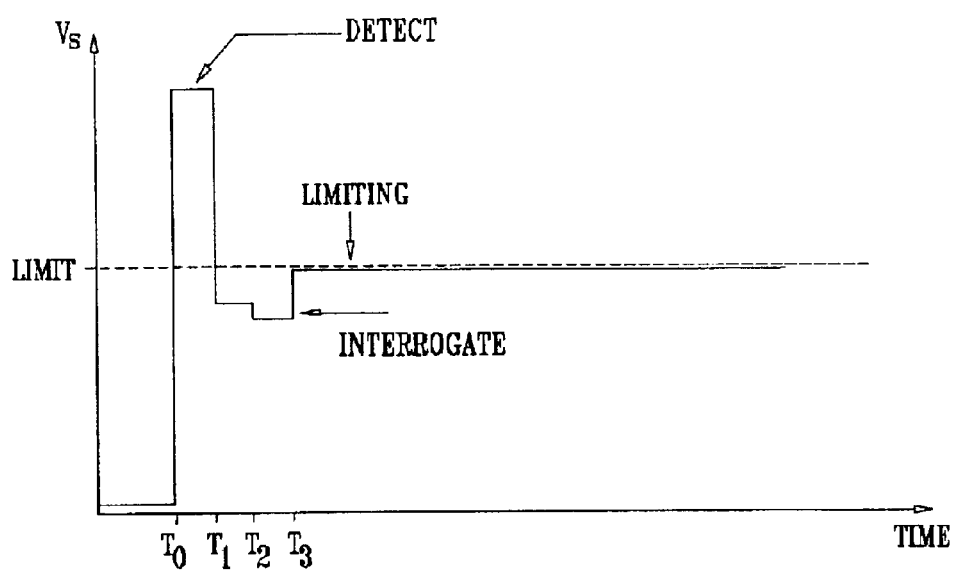
FIG. 11 is a Cartesian plot showing sampled load current as a function of time, which is output by a power distribution unit operating in accordance with the method of FIG. 10.

FIG. 11 is a schematic Cartesian plot showing the sense voltage $V_S$ measured over time as the method of FIG. 10 is carried out. Typically, $I_{LIM}$ is set to be 500 mA, and $V_S$ is measured using a 1 ohm resistor, so that the limit level marked in the figure is approximately 0.5 V. At time $T_0$ the load is switched on, leading to detection of a current overload (step 114). At time $T_1$, processor 52 reduces the gate voltage of limiter 32 to the VG1 value (step 118), followed at time $T_2$ by a further reduction to the VG2 value (step 120). Based on the values of $V_S$ measured at these two settings, the processor determines the fitting parameters (step 122) and then sets the gate voltage to its target value at time $T_3$ (step 124). The entire process, from $T_0$ to $T_3$, typically takes less than 2 μs.

FIG. 12 is a flow chart that schematically illustrates a method used by processor 52 for setting the operating point of limiter 32, in accordance with another preferred embodiment of the present invention. In its initial iteration through steps 110 to 124, this method is substantially identical to that shown in FIG. 11. In the present embodiment, however, the closed-loop control provided by steps 126, 128 and 130 is replaced by an open-loop method. According to this method, after setting the target gate voltage at step 124, processor 52 waits for a predetermined period of time, typically about 50 ms. This much time is typically sufficient for a "normal" current overload, due to charging of capacitor 28, for example, to be resolved. After the waiting period is over, the processor checks the present value of $V_S$, at a delayed sampling step 132. Based on this value, the processor compares the load current to $I_{CUT}$, at a lower limit checking step 134. If the load current has dropped below this level, it means that the overload has been resolved, and the gate voltage is returned to its original value, for low-impedance operation of limiter 32, at step 110, as described above.

If the load current is still greater than $I_{CUT}$ at the end of the waiting period, however, it is probably the result of a malfunction in the load or a short circuit in the load or the line connecting to it. In this case, the gate voltage is set to zero, shutting off limiter 32, at a shutoff step 136. The main reason for imposing the time limit at step 132 and then immediately shutting off the current at step 136 is that limiter 32 may not be able to withstand extended power dissipation at high current. The current is therefore turned off at step 136 in order to avoid thermal damage to supply 22. In this case, processor 52 typically marks the connection as faulty. It may retry the connection after a longer waiting period, say 5 sec, in order to permit automatic recovery from accidental faults. Alternatively, instead of complete shutoff, the current may be allowed to continue to run at a very low level, which limiter 32 is able to sustain. As a further alternative, the closed-loop method of steps 120 through 130 in FIG. 10 may be allowed to run until either the load current drops below $I_{CUT}$ or the waiting period has expired, whichever comes first.

Figure 13:
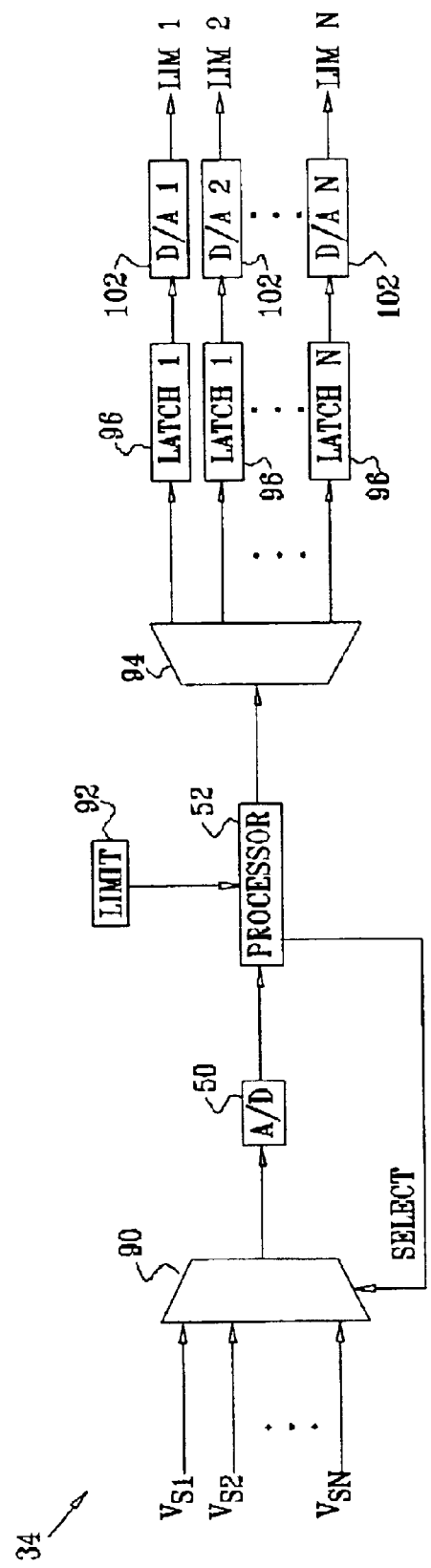
FIG. 13 is a block diagram that schematically illustrates current control circuitry used in a master power distribution unit serving multiple clients, in accordance with a preferred embodiment of the present invention.

FIG. 13 is a block diagram that schematically shows details of controller 34 implementing a scheme for sharing processing resources among multiple client connections of a master supply, in accordance with a preferred embodiment of the present invention. This embodiment is similar to that shown in FIGS. 6 and 7 above, in that a single processor 52 controls the current supplied to all the client loads, using a respective limiter 32 on each load connection. In the present embodiment, the limiters comprise variable-impedance elements, such as FETs, as shown in FIG. 9. Latches 96 hold the respective gate voltage value that is set by processor 52 for each of the limiters. D/A converters 102 convert the voltage values to analog voltages, which are applied to the gates of the respective limiters.

Figure 14A:
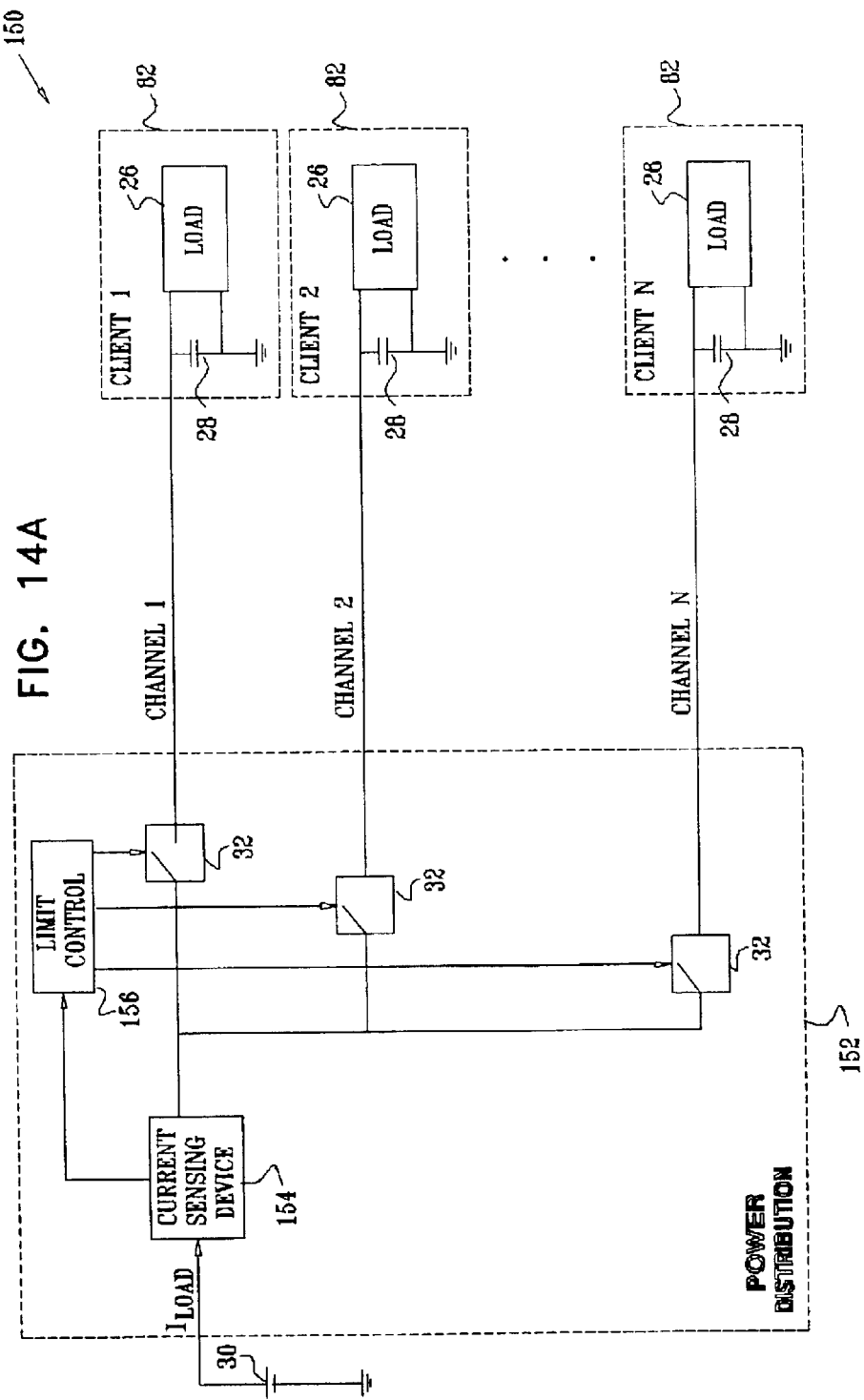
FIGS. 14A and 14B are schematic circuit diagrams that illustrate control circuitry used by a master power distribution unit to limit the current that it supplies to multiple clients, in accordance with preferred embodiments of the present invention.

FIG. 14A is a block diagram showing a system 150 for supplying power to multiple clients 82, in accordance with a further preferred embodiment of the present invention. System 150 comprises a master supply 152, which, as in the preceding embodiment, uses a single controller 156 to operate multiple current limiters 32 on the different client connection channels. Substantially any type of limiter may be used in this context, such as either PWM-based limiters of the type shown in FIG. 2, or variable-impedance limiters, as shown in FIG. 9.

In contrast to the previous embodiments, supply 152 uses a single current-sensing device 154 to monitor the load current and detect overloads on all the channels. Device 154 may comprise a sense resistor, for example, as shown in FIGS. 2 and 9, or it may comprise other sorts of current-sensing element, such as an inductive current sensor. Further alternatively, the current may be measured using a Hall effect sensor or by measuring the drain/source voltage $V_{DS}$ of a FET through which the current passes. Since the drain/source resistance $R_{DS}$ of the FET is known, the current I is given simply by $V_{DS}/R_{DS}$. Details of this technique are described, for example, by Lenk in Fairchild Semiconductor Application Bulletin AB-20, entitled "Optimum Current Sensing Techniques in CPU Converters" (1999), which is incorporated herein by reference.

Figure 14B:
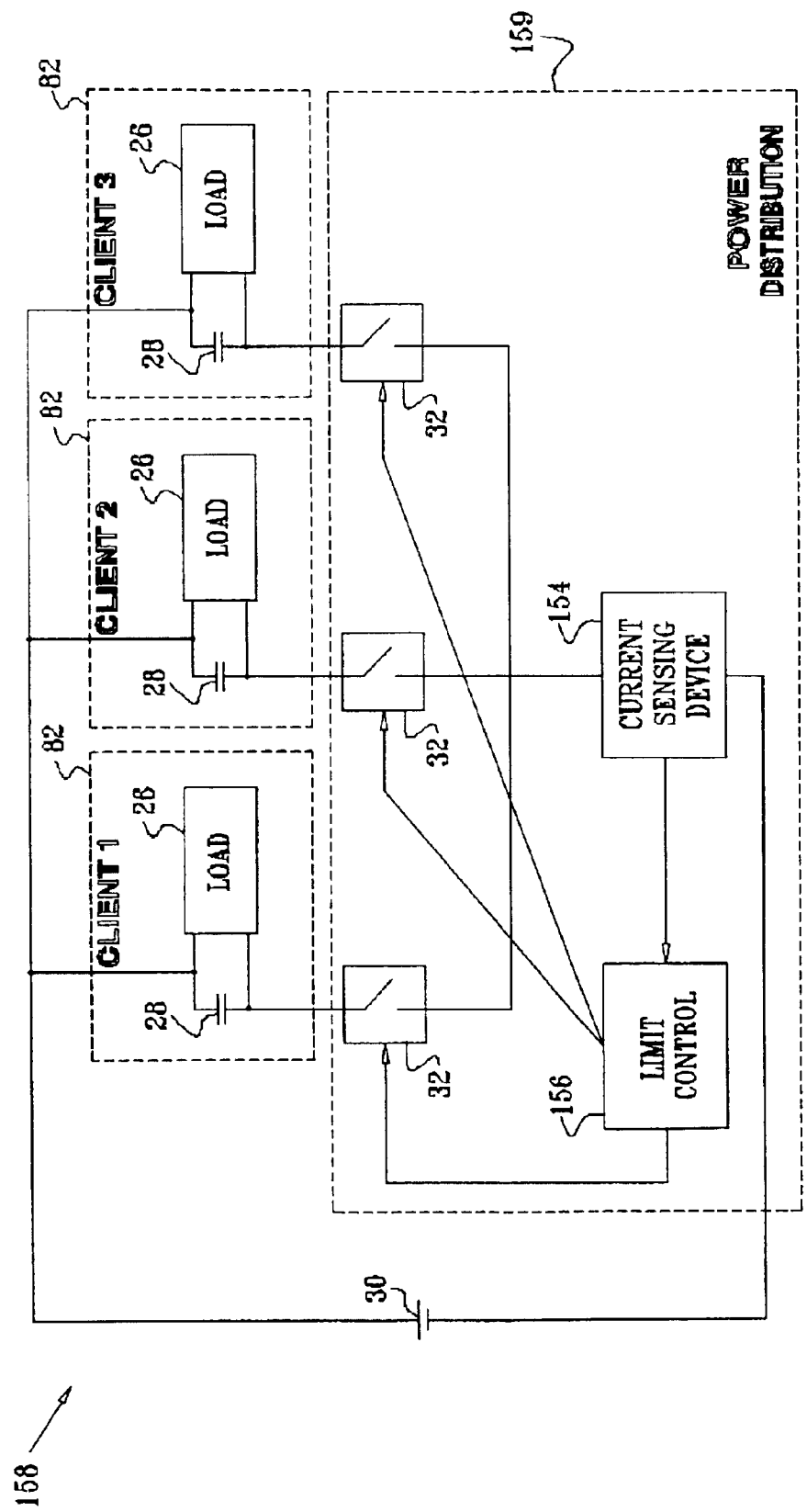

FIG. 14B is a block diagram that schematically illustrates a system 158 for supplying power to multiple clients 82, in accordance with another preferred embodiment of the present invention. This embodiment is similar to that shown in FIG. 14A, except that here a master power distribution unit 159 is configured so that current-sensing device 154 and current limiters 32 are located on the negative side of power supply 30, rather than on the positive side as in system 150.

The use of the single current-sensing device 154 to serve multiple clients reduces the part count of power distribution units 152 and 159, and thus reduces their cost, as well. Preferably, the current-sensing device is applied to each of the connections in turn, in a round robin. A number of possible sharing schemes for this purpose are described hereinbelow.

Figure 15:
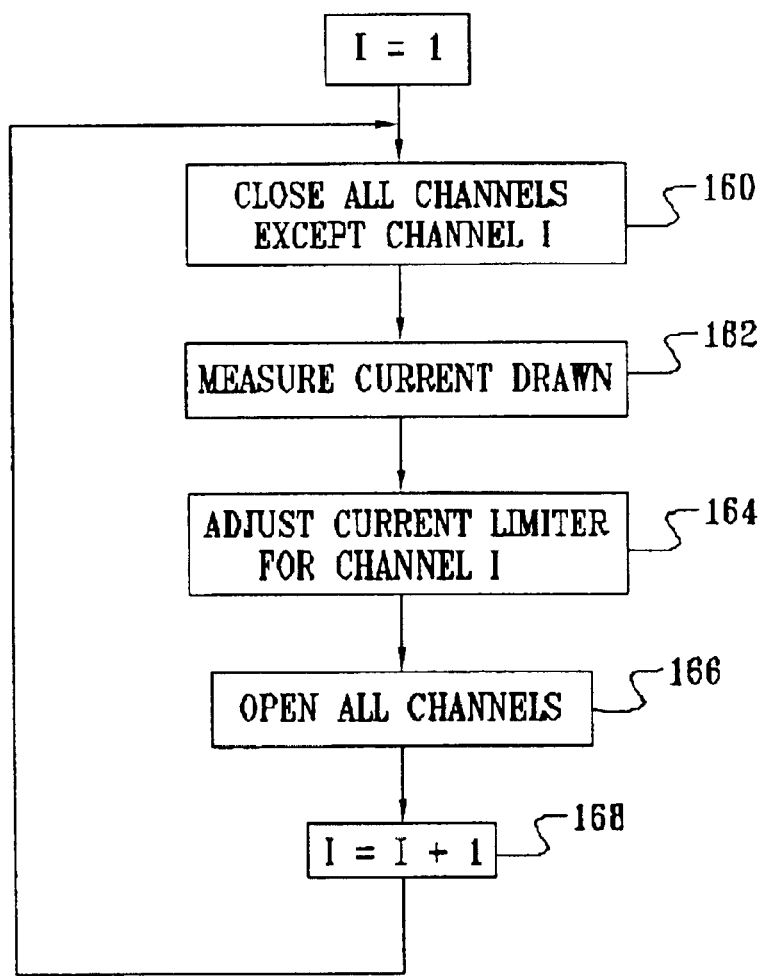
FIG. 15 is a flow chart that schematically illustrates a method for controlling current output by a master power distribution unit to multiple clients, in accordance with a preferred embodiment of the present invention.

FIG. 15 is a flow chart that schematically illustrates a method for current monitoring using shared sensing device 154, in accordance with a preferred embodiment of the present invention. This method makes use of the fact that each client has its own storage capacitor 28, which provides a sufficient voltage to load 26 even when current on the respective connection is temporarily interrupted. The method steps cyclically through all N connections served by supply 152, from channel 1 through N, and repeating indefinitely thereafter.

After all of capacitors 28 have been charged, controller 156 shuts off all of limiters 32, except the limiter serving the channel currently under test, at a shutoff step 160. The channel under test is referred to here by the index I. In this situation, sensing device 154 measures the current drawn from master supply 152, at a current measuring step 162. Because of the setting of limiters 32, the current is supplied only to channel I and is indicative of the possible presence of an overload on the channel. In the event that controller 156 detects an overload, it adjusts the setting of the current limiter for channel I, at an adjustment step 164, preferably using one of the methods described above. All the channels are then again turned on, at a reopening step 166, to allow capacitors 28 to recharge before proceeding. The channel index I is incremented, at a next channel step 168, and steps 160 through 166 are repeated for the next channel. When I reaches the maximum value, N, it wraps back to 1 for the next iteration.

FIG. 16 is a flow chart that schematically illustrates another method for current monitoring using shared sensing device 154, in accordance with a preferred embodiment of the present invention. This method assumes that the rate at which device 154 samples the current is much greater than the typical rates of changes of the currents in the different channels. Device 154 first measures the total current flowing through all of channels 1 through N, at a total measurement step 170, with all of limiters 32 set to allow the current to flow. The limiter of the channel to be measured (channel I) is shut off, at a channel shutoff step 172, and device 154 measures the current drawn by the remaining channels, at a remainder measurement step 174. The current drawn by channel I is then calculated simply by taking the difference of the current measurements made at steps 170 and 174.

Controller 156 checks the difference of the currents against the applicable current limit $I_{LIM}$ for the channel under measurement, at a limit checking step 178. If the current is within the limit, the channel index is incremented, at a next channel step 180, and the process continues with the next channel, beginning again from step 170. If the current is over the limit, controller 156 checks to make sure that the current is not greater than the maximum that is possible on a single channel, at a range checking step 182. An out-of-range difference measurement at this step is probably indicative of an error in the measurement process. For example, if the currents on multiple channels changed sharply during the time between steps 170 and 174, the current difference calculated at step 176 will be out of range. In such a case, the present measurement results are invalid, and the measurement process must be restarted, at a restart step 184. The measurements then continue from step 170, resuming with the same channel at which they were interrupted.

If the difference of the currents measured for channel I is greater than $I_{LIM}$ but not out of range, the setting of limiter 32 for channel I is adjusted to reduce the current to within $I_{LIM}$, at an adjustment step 186. The limiter is then turned on at this setting, allowing current to flow from supply 152 to channel I, at a reopening step 188. The process continues with the next channel at step 180.

When limiters 32 are based on PWM, as in the embodiment of FIG. 2, sensing device 154 may take advantage of the PWM to measure the current drawn by each of the channels without having to shut off any of the limiters during measurement. This type of measurement can be accomplished by operating switches 40 in PWM mode at all times, with respective gate voltage waveforms (as shown in FIG. 3) that do not overlap with one another. The duty cycle of each channel and the current drawn from the power supply during the time that the respective gate voltage is high are together indicative of the current drawn by the respective client.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. Power distribution apparatus, for controlling supply of a current from an electrical power source to at least one load, the apparatus comprising:
   a current limiter, which is coupled to controllably reduce a magnitude of the current supplied to the at least one load;
   a current sensor, which is coupled to provide an indication of a magnitude of the current flowing to the at least one load; and
   a controller, adapted to:
      a) set said current limiter to operate at first and second settings, said second setting being different from said first setting, and to determine, using said current sensor, first and second magnitudes of the current at said first and second settings, respectively;
      b) determine an estimated current limiting characteristic based on said first and second magnitudes;
      c) set said current limiter to a third setting; and
      d) receive said indication from the current sensor of a third magnitude of the current at said third setting,
   said controller being adapted, responsive to said indication, to determine whether said third magnitude of the current at said third setting exceeds a predetermined maximum and if so, to select a target setting of said current limiter responsive to said estimated current limiting characteristic, so as to reduce the magnitude of the current to less than said predetermined maximum.

2. Apparatus according to claim 1, wherein said controller is adapted to determine, using said current sensor, a new magnitude of the current at said target setting of the current limiter, and to adjust the setting of the current limiter responsive to said new magnitude until said new current magnitude converges to a predetermined range.

3. Apparatus according to claim 2, wherein said controller is adapted to use said new magnitude of the current determined at said target setting to revise said estimated current limiting characteristic, and to select a new target setting of said current limiter based on said revised estimated current limiting characteristic.

4. Apparatus according to claim 1, wherein said controller is adapted to determine, using said current sensor, the magnitude of the current at said target setting, and to restore said third setting of said current limiter if the current is below a predetermined minimum.

5. Apparatus according to claim wherein 4, the controller is adapted to determine the magnitude of the current at the target setting after a predetermined delay, and to control the current limiter so as to shut off the current to the at least one load if the current has not dropped below the predetermined minimum.

6. Apparatus according to claim 1, wherein the current limiter comprises a variable-impedance device, and wherein the first and second settings correspond respectively to first and second impedance settings.

7. Apparatus according to claim 6, wherein said variable-impedance device comprises a transistor, the apparatus further comprising a digital/analog converter coupled to receive said first and second impedance settings from said controller and, responsive thereto, to apply respective first and second gate voltages to said transistor.

8. Apparatus according to claim 1, wherein the current limiter comprises a pulse width modulator, which is coupled to apply pulse width modulation to the current supplied to the at least one load, and wherein the first and second settings correspond respectively to first and second duty cycles of the pulse width modulation.

9. Apparatus according to claim 1, wherein said controller is adapted to determine fitting parameters so as to fit a curve to said first and second magnitudes as a function of said first and second settings, said estimated current limiting characteristic being a function of said fitting parameters.

10. Apparatus according to claim 1, wherein the at least one load comprises a plurality of loads, and
    wherein said current limiter comprises a plurality of current limiters, respectively coupled to reduce the magnitudes of the respective currents, and
    wherein said controller comprises a single digital processor, which is adapted to estimate respective current limiting characteristics for two or more of said plurality of current limiters.

11. Apparatus according to claim 10, wherein the current sensor comprises a single current sensing device, which is coupled to sample the respective currents supplied to the plurality of the loads so as to provide the magnitudes of the respective currents to the digital processor.

12. Apparatus according to claim 1, wherein the electrical power source is coupled to supply the current to said plurality of loads over a local area network (LAN).

13. Apparatus according to claim 12, wherein the current limiter and the current sensor are coupled to the LAN an a mid-span configuration.

14. Apparatus according to claim 12, wherein the current limiter and the current sensor are coupled to the LAN together with a switching hub in an end-span configuration.

15. A method for controlling supply of power to at least one load, comprising:
    supplying a current to the at least one load through a current limiter;
    setting said current limiter to a first setting and a second setting, said second setting being different from said first setting;
    sampling the current to determine first and second magnitudes thereof at said first and second settings, respectively, of said current limiter;
    estimating a current limiting characteristic based on said first and second magnitudes;
    setting said current limiter to a third setting;
    sampling the current to determine whether the magnitude of the current at said third setting exceeds a predetermined maximum; and
    if said magnitude of the current at said third setting exceeds said predetermined maximum,
    selecting a target setting of said current limiter responsive to said estimated current limiting characteristic, so as to reduce the magnitude of the current to less than said predetermined maximum.

16. A method according to claim 15, and comprising sampling the current at said target setting to determine a new magnitude of the current, and adjusting the setting of said current limiter responsive to said new magnitude until the sampled current converges to a predetermined range.

17. A method according to claim 16, wherein adjusting the setting comprises using the new magnitude of the current determined at the target setting to revise the estimated current limiting characteristic, and selecting a new target setting of the current limiter based on the revised estimated characteristic.

18. A method according to claim 15, and comprising sampling the current at said target setting, and restoring said third setting of the current limiter if the current is below a predetermined minimum.

19. A method according to claim 18, wherein sampling the current comprises sampling the current alter a predetermined delay, and comprising shutting off the current to the load if the current has not dropped below the predetermined minimum.

20. A method according to claim 15, wherein said current limiter comprises a variable-impedance device, and wherein said first and second settings correspond respectively to first and second impedance settings.

21. A method according to claim 20, wherein the variable-impedance device comprises a transistor, and wherein the first and second impedance settings correspond respectively to first and second gate voltages applied to the transistor.

22. A method according to claim 15, wherein said current limiter comprises a pulse width modulator, which is coupled to apply pulse width modulation to the current supplied to the load, and wherein said first and second settings correspond respectively to first and second duty cycles of said pulse width modulation.

23. A method according to claim 15, wherein estimating said current limiting characteristic comprises determining fitting parameters so as to fit a curve to said first and second magnitudes as a function of said first and second settings.

24. A method according to claim 15, wherein supplying the current comprises supplying respective currents to a plurality of loads through respective current limiters, and wherein estimating said current limiting characteristic comprises using a single digital processor to estimate respective current limiting characteristics for two or more of said current limiters.

25. A method according to claim 24, wherein sampling the current comprises sampling the respective currents supplied to the plurality of the loads using a single current sensing device to determine and provide the magnitudes of the respective currents to the digital processor.

26. A method according to claim 15, wherein said supplying a current comprises supplying a current to the at least one load over a local area network (LAN).

27. A method for controlling supply of power to at least one load, comprising:

supplying a current to the at least one load through a current limiter at an initial setting of the current limiter;

sampling the current to determine whether an initial magnitude of the current exceeds a predetermined maximum;

if the current exceeds the predetermined maximum, sampling the current to determine first and second magnitudes thereof at first and second settings, respectively, of the current limiter, at which first and second settings the current passed by the current limiter is less than the current at the initial setting;

estimating a current limiting characteristic based on the first and second magnitudes; and selecting a target setting of the current limiter responsive to the estimated current limiting characteristic, so as to reduce the magnitude of the current to less than the predetermined maximum.

28. Apparatus according to claim 1, wherein said controller is adapted to set said current limiter to a plurality of first and second settings at a plurality of temperatures of said current limiter, and to determine a plurality of estimated current limiting characteristics as a function of temperature.

29. Apparatus according to claim 28, wherein said target setting is selected responsive to one of said plurality of estimated current limiting characteristics, said one of said plurality of estimated current limiting characteristics being selected as a function of the temperature of the current limiter.

30. A method according to claim 15, wherein said setting of said current limiter to a first and second setting is accomplished at a plurality of temperatures, and further comprising estimating a plurality of current limiting characteristics as a function of said respective temperatures.

31. A method according to claim 30, further comprising obtaining a temperature indication of said current limiter; wherein said selecting a target setting accomplished responsive to said estimated current limiting characteristic selected from said plurality of current limiting characteristics, said selected estimated current limiting characteristic being selected responsive to said obtained temperature indication.

* * * * *